Patented Dec. 7, 1926.

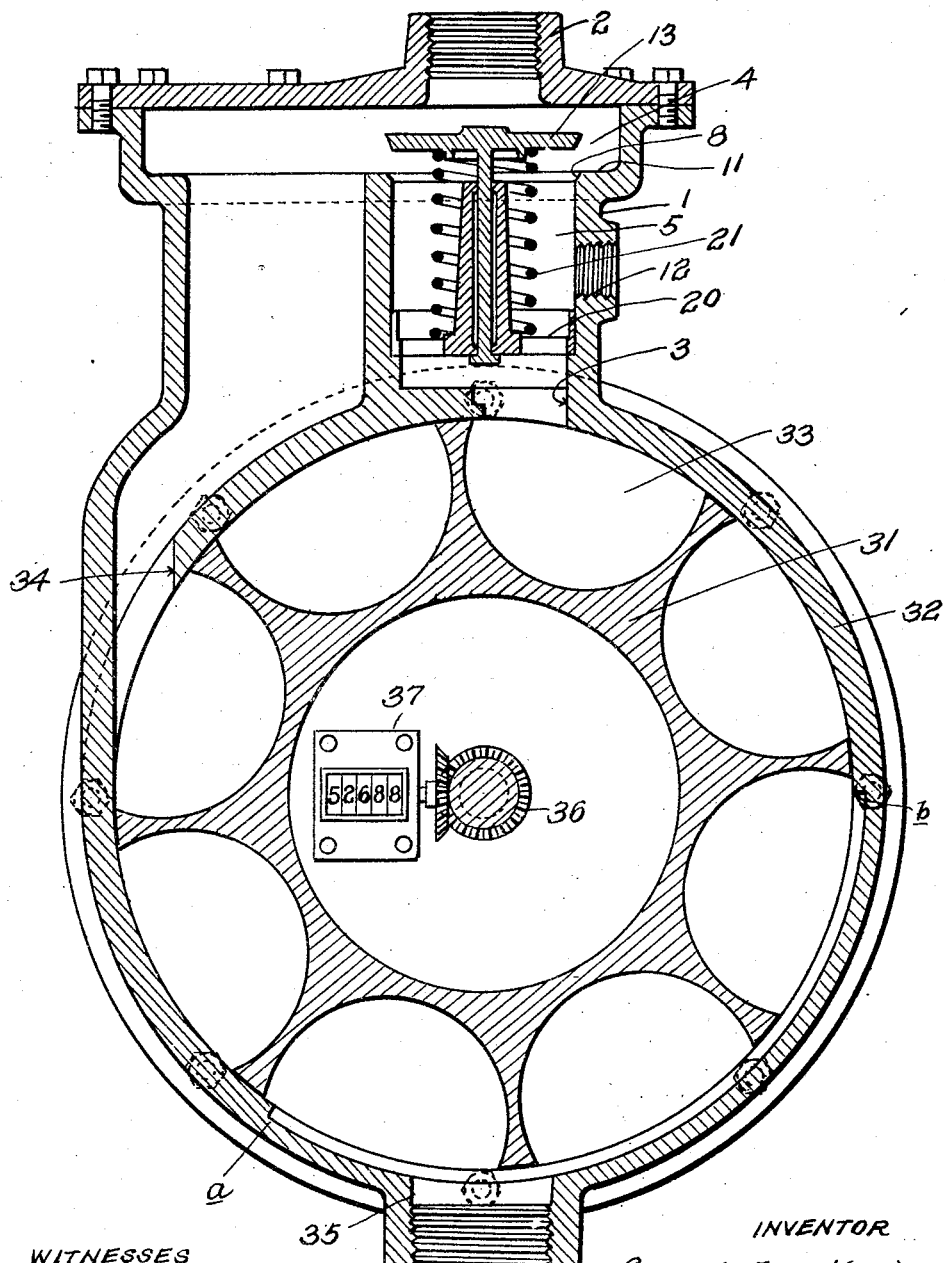

1,609,910

UNITED STATES PATENT OFFICE.

GEORGE W. MacKENZIE, OF BEAVER, PENNSYLVANIA.

LIQUID-DISPENSING APPARATUS.

Application filed April 15, 1925. Serial No. 23,231.

My invention relates to dispensing apparatus for liquid, and finds practical application in gasoline-dispensing apparatus. In that application I shall, by way of example, describe it. The invention constitutes an improvement upon the apparatus disclosed in my application for United States Letters Patent, filed November 16, 1923, Serial No. 675,127. Stated in a word, the present invention consists in combining with dispensing apparatus essentially such as that disclosed in my earlier application alluded to, a rotary meter. Additionally, my present invention includes specific features presently to be described and claimed.

In the accompanying drawing my improved apparatus is shown in vertical section.

As with the apparatus of my earlier application, a stream of liquid flowing under gravity through a conduit to a place of delivery is, by essentially the same means, segregated as it flows, into a succession of units. A suitable, essentially cylindrical, and vertically standing casing 1 is provided above with an inlet tap 2, and below with an outlet orifice 3. The casing is divided internally by a horizontally extending web 11 into inlet and outlet chambers 4 and 5. Through the web opens a circular orifice, whose rim constitutes a valve seat 8. A poppet-valve 13 moves vertically, rising from and descending to the seat 8. The wall of the delivery chamber 5 is at an elevated point ported to the air, as indicated at 12.

Compensation is made for the weight of the valve, and this compensation conveniently takes the form of a spring 21 carried upon a spider 20 and engaging valve 13 from below and tending to maintain it in the elevated position shown in the drawing.

These are the essential features of the structure. If it be understood that the inlet chamber 4 is full of gasoline supplied under gravity, and that the outlet chamber 5 is empty and open, it will be perceived that, while gasoline is streaming through the orifice, valve 13 will be carried, against the tension of its sustaining spring, to its seat, and thus the flow will be cut off. The valve 13 so forcibly carried to its seat will rebound, and, so long as there is an unfailing supply of gasoline to afford head above, and free conveyance for the gasoline delivered below, the valve will continue in vertical oscillation, closing and opening again, and this oscillation is periodic, and with each rise and descent of the valve a unit quantity of gasoline will be delivered. Thus far I have described a structure which is disclosed in my former application.

I have in this case so far modified the organization, that I do not rely upon the valve 13 as the measuring element. I provide additionally a rotary meter, and I employ the valve 13 within its casing primarily as the means for producing a water-hammer, to drive the rotary meter; secondarily, I cause the liquid which in segregated units passes the valve 13 to enter the succession of measuring pockets with which the rotary meter is provided.

The rotary meter includes a cylindrical rotor 31, turning within a cylinder 32. This structure is arranged on horizontal axis, and the orifice 3 from the delivery chamber 5 of of the unit-segregating apparatus, opens through the cylinder wall at its upper part.

The rotor 31 is provided with a succession of peripheral pockets 33, of equal and predetermined capacity, and the capacity of the pocket is the unit of mensuration. The pocket wall at its periphery extends in substantially radial direction with respect to the axis.

A second orifice 34 is formed in the wall of cylinder 32. This second orifice is arranged on one side, in this instance on the left hand side, and there is free communication, as appears in the drawing, from the inlet chamber 4 through this orifice 34. The stream which enters through orifice 34 enters in substantially tangential direction with respect to the rotor, and it impinges upon the radially disposed walls of the pockets. A third orifice 35 opens from the cylinder at the lowest point and affords escape for the measured gasoline. It will be perceived of the orifice 35 that whereas elsewhere the rotor makes close fit within the cylinder, in this portion of its extent the cylinder wall is offset, from $a$ to $b$, to the end that, from the moment when the advance rim of a pocket comes opposite direct discharge to the orifice 35 until the empty pocket has passed beyond the range of direct discharge, there is a widened passageway of escape from the pocket through the orifice.

With the parts so arranged, operation may be briefly explained. It will be perceived that, so long as a stream of gasoline flows to and fills the inlet chamber 4, rotor 31 will be subject to hydraulic head, tending to turn it, and this tendency will be augmented by the weight of liquid contained in the pockets on the left. The head, however, will, under ordinary circumstances, be variable, depending on the depth of gasoline in the tank from which the supply of gasoline is drawn, and the forces thus far mentioned will be of uncertain and doubtful efficacy, themselves to drive the rotor 31. But the provision of the reciprocatory valve 13 brings it about that, on each seating of valve 13 a water-hammer is produced, tending also to turn the rotor 31 in anti-clockwise direction. This water-hammer is a relatively great force, entirely adequate to turn the rotor, and, furthermore under varying conditions of head in the gasoline supply, it still is a practically invariable force and produces a uniform effect. By the provision of the means described, to produce a periodically recurrent water-hammer, I am able to drive a rotary meter under conditions of low and irregular head,—conditions which otherwise would not admit of the use of a rotary meter.

As the filled pockets come to the lowest point in the course of rotation they deliver their burden through orifice 35. And always, while the pockets on the left are full, the pockets on the right are empty.

Rotation of the shaft 36 which carries rotor 31 is imparted to a tally meter 37 or equivalent measuring or recording apparatus, as is somewhat diagrammatically shown in the drawing.

It will be perceived that the valve 13 has ceased to be the controlling measuring member and has become the member by which the desired recurrent water-hammer is brought about. At the same time, the parts are so proportioned that the peripheral pockets 33 of the rotor, as they approach the orifice 34 are open to delivery chamber 5, and they receive and carry forward the units of liquid passed by valve 13.

It will further be perceived that, since delivery chamber 5 is ported to the air at 12, this initial access of liquid to the pockets 33 is free, and this is a feature of value and importance in the operation of the rotary meter.

I claim as my invention:

1. In liquid-dispensing apparatus the combination of a pressure-operated meter, a conduit adapted to convey liquid to the meter, and having an orifice in its wall through which a second line of communication leads to the meter, a valve arranged within the conduit and reciprocable to and from its seat in such orifice.

2. In liquid-dispensing apparatus the combination of a cylinder, a rotor turning within the cylinder and provided with peripheral pockets having radially-extending walls, a conduit for liquid opening tangentially through the cylinder wall and to the pockets of the rotor within, and means for subjecting a stream of liquid flowing through the conduit and to the cylinder to recurrent water-hammer.

3. In liquid-dispensing apparatus the combination of a cylinder, a rotor turning within the cylinder and provided with peripheral pockets, a conduit opening through the cylinder wall to the pockets of the contained rotor, said conduit being provided with an orifice in its wall, a valve reciprocable within said conduit to and from its seat in such orifice, and a passageway ported to the air for liquid delivered through said orifice, such passageway opening through the wall of the said cylinder to the pockets of the contained rotor.

4. In liquid-dispensing apparatus the combination of a horizontally disposed cylinder, ported above and below and through one side, a bifurcated passageway leading from a source of liquid supply to the upper port and to the lateral port through the cylinder wall, an automatically reciprocable valve controlling flow through the passageway to the upper port, and a peripherally pocketed rotor arranged within said cylinder.

5. In liquid-dispensing apparatus the combination of a horizontally disposed cylinder, ported above and below and through one side, a rotor provided with peripheral pockets having radially disposed walls arranged within the cylinder, a conduit for liquid opening tangentially through the lateral port in the cylinder wall, said conduit having an orifice in its wall, a valve arranged within the conduit and reciprocable to and from its seat in said orifice, and a passageway with ported wall leading from the orifice in the conduit wall and opening through the upper port in the cylinder wall.

6. In liquid-dispensing apparatus the combination of a horizontally arranged cylinder provided with orifices above and below and through one side, a rotor rotatable within the cylinder, said rotor being provided with peripheral pockets which in the course of rotation register succesively with said orifices, a casing borne by said cylinder and divided horizontally into an upper inlet chamber and a lower outlet chamber, said inlet chamber being in communication through the lateral orifice in the cylinder wall with the rotor, said outlet chamber being ported to the air and being in communication through the upper orifice in the cylinder wall with the rotor, and an automatically oscillatory valve controlling communication from inlet to outlet chamber.

7. In liquid-dispensing apparatus the combination of a horizontally arranged cylinder provided with orifices above and below and through one side, a rotor within said cylinder provided with a succession of peripheral pockets, a casing borne by said cylinder and divided into an upper inlet chamber and a lower outlet chamber, said inlet chamber being adapted to receive an inflowing stream of liquid and said outlet chamber being in communication through the upper orifice in the cylinder with the rotor within, means for passing a segregated succession of units of liquid from inlet to outlet chamber within said casing, the inlet chamber being in constant communication through the lateral orifice in the cylinder with the rotor within the cylinder.

In testimony whereof I have hereunto set my hand.

GEORGE W. MacKENZIE.